United States Patent [19]
Bair et al.

[11] Patent Number: 5,463,563
[45] Date of Patent: Oct. 31, 1995

[54] AUTOMATIC LOGIC MODEL GENERATION FROM SCHEMATIC DATA BASE

[75] Inventors: Owen S. Bair; Patrick Yin; Chih-Chung Chen, all of San Jose, Calif.

[73] Assignee: LSI Logic Corporation, Milpitas, Calif.

[21] Appl. No.: 85,658

[22] Filed: Jun. 30, 1993

Related U.S. Application Data

[63] Continuation of Ser. No. 684,668, Apr. 12, 1991, Pat. No. 5,278,769.

[51] Int. Cl.$^6$ ................................................. G06F 17/50
[52] U.S. Cl. ........................... 364/490; 364/489; 364/488
[58] Field of Search ............................... 364/488, 489, 364/578, 490

[56] References Cited

U.S. PATENT DOCUMENTS

| | | | |
|---|---|---|---|
| T940,020 | 11/1975 | Brechling et al. | 444/1 |
| 4,635,208 | 1/1987 | Coleby et al. | 364/491 |
| 4,827,427 | 5/1989 | Hyduke | 364/489 |
| 4,831,543 | 5/1989 | Mastellone | 364/489 |
| 4,922,432 | 5/1990 | Kobayashi et al. | 364/490 |
| 4,967,367 | 10/1990 | Piednoir | 364/489 |
| 4,970,664 | 11/1990 | Kaiser et al. | 364/521 |
| 5,051,911 | 9/1991 | Kimura et al. | 364/489 |
| 5,084,824 | 1/1992 | Lam et al. | 364/490 |
| 5,111,413 | 5/1992 | Lazansky et al. | 364/578 |
| 5,278,769 | 1/1994 | Bair et al. | 364/490 |

OTHER PUBLICATIONS

"Methods Used In An Automatic Logic Design Generator (ALERT)", by Friedman et al., IEEE Transactions On Computers, vol. C18, No. 7, Jul. 1969, pp. 593–614.

"Quality Of Designs From An Automatic Logic Generator (ALERT)", by Friedman et al., IEEE Design Automation Conference, 1970, pp. 71–80.

"Switch–Level Delay Models For Digital MOS VLSI", by Ousterhout, IEEE 21st Design Automation Conference, 1984, pp. 542–548.

"Automatic Generation Of Digital System Schematic Diagrams", by Arya et al., IEEE 22nd Design Automation Conference, 1985, pp. 388–395.

Primary Examiner—Vincent N. Trans

[57] ABSTRACT

An automatic logic-model generation system operates on a schematic database and produces logic models incorporating accurate timing information. A verification process is also performed whereby the model is automatically verified for accuracy.

4 Claims, 11 Drawing Sheets

| CB/SQ | ffCELL | TIME | PATTERN | INCHG1 | INCHG2 | OUTPUT | D0 | D1 |
|---|---|---|---|---|---|---|---|---|
| CB | nil | nil | --00--1 | MODE | nil | DOUT | 1.1 | 2.1 |
| SQ | U2 | CP_Q | 0100000 | ENB | nil | TDO | 3.2 | nil |
| SQ | U2 | CP_Q | 0110000 | ENB | nil | TDO | nil | 2.9 |
| SQ | U2 | CP_QN | 0100000 | ENB | nil | TDO | nil | 1.9 |
| SQ | U2 | CP_QN | 0110000 | ENB | nil | TDO | 3.8 | nil |
| SQ | U2 | D_SETUP | 0100000 | DINPN | ENB | TDO | nil | 1.9 |
| SQ | U2 | D_SETUP | 0100001 | MODE | ENB | TDO | 4.2 | 3.5 |
| SQ | U2 | D_HOLD | 1100000 | DINPN | ENB | TDO | 3.9 | nil |
| SQ | U2 | D_HOLD | 1101001 | MODE | ENB | TDO | nil | 2.3 |

FIG. 9

```
U6_SD:D1   U6_ZD:D0   1.1
U6_SD:D0   U6_ZD:D1   2.1
U3_ZD:D1   U2_CPD:D1   U2_S2D:D1   U2_QD:D0    3.2
U3_ZD:D1   U2_CPD:D1   U2_S2D:D0   U2_QD:D1    2.9
U3_ZD:D1   U2_CPD:D1   U2_S2D:D1   U2_S3D:D0   U2_QND:D1   1.9
U3_ZD:D1   U2_CPD:D1   U2_S2D:D0   U2_S3D:D1   U2_QND:D0   3.8
U2_DND:D0  U2_CPD:D1   U6_ZD:D0    U5_ZD:D0    U6_ZD:D1    -U3_ZD:D1   1.9
U2_DND:D0  U2_M2D:D1   U2_M3D:D0   -U2_CPD:D1  U6_SD:D1    U6_ZD:D0    U5_ZD:D1   3.5
U2_CPD:D1  -U2_DND:D0  U6_SD:D0    U6_ZD:D1    U5_ZD:D1    -U3_ZD:D0   3.9
U2_CPD:D1  -U2_DND:D1  U6_ZD:D1    U5_ZD:D0    -U3_ZD:D0   2.3
```

```
MODULE      BSCN2_VRL"XXXXX";
INPUTS      DINPN      "CAP=XXXXX",
            ENB        "CAP=XXXXX",
            MODE       "CAP=XXXXX",
            SETN       "CAP=XXXXX",
            SHIFT      "CAP=XXXXX",
            TCK        "CAP=XXXXX",
            TDI        "CAP=XXXXX",
            UPDATE     "CAP=XXXXX";
OUTPUTS     DOUT       "CAP=XXXXX,
                        RPRN=(XXXXX,XXXXX),
                        DELPATH=(XXXXX)",
            TDO        "CAP=XXXXX,
                        RPRN=(XXXXX,XXXXX),
                        DELPATH=(XXXXX)";
LEVEL       CELL;
DELAYS      U3_ZD      "D1D0=( 1.70, 0.00)",
            U6_SD      "D1D0=( 1.60, 2.10)",
            U5_ZD      "D1D0=( 3.75, 0.00)",
            U2_CPD     "D1D0=( 0.20, 0.00)",
            U2_DND     "D1D0=( 0.00, 0.05)",
            U2_S2D     "D1D0=( 0.00, 1.00)",
            U2_S3D     "D1D0=( 0.90, 0.00)",
            U2_QD      "D1D0=( 0.00, 1.30)",
DEFINE      Z24        = ZAN       (ENB,TCK)/U3_ZD/         ;
            Z26        = ZMUX      (UPDATE,TDO,Z28)         ;
            Z27        = ZNAN      (Z26)                    ;
            Z28        = ZNAN      (SETN,Z27)               ;
            Z29        = ZNAN      (Z28)                    ;
            Z30        = ZAN       (MODE)/U6_SD/            ;
            Z31        = ZMUX      (Z30,DINPN,Z29)          ;
            DOUT       = ZNAN      (Z31)                    ;
            Z34        = ZMUX      (SHIFT,DOUT,TDI)         ;
            Z35        = ZNAN      (Z34)/U5_ZD/             ;
            Z36        = ZAN       (Z24)/U2_CPD/            ;
            Z37        = ZNAN      (Z35)/U2_DPD/            ;
            Z38        = ZMUX      (Z36,Z37,Z40)            ;
            Z39        = ZNAN      (Z38)                    ;
            Z40        = ZNAN      (Z39)                    ;
            Z41        = ZMUX      (Z36,Z43,Z39)            ;
            Z42        = ZNAN      (Z41)/U2_S2D/            ;
            Z43        = ZNAN      (Z42)/U2_S3D/            ;
            Z44        = ZNAN      (Z42)/U2_QD/             ;
            TDO        = ZNAN      (Z43)                    ;
END         MODULE;
```

AUTOMATIC LOGIC MODEL GENERATION FROM SCHEMATIC DATA BASE

CROSS-REFERENCE TO RELATED APPLICATIONS

This is a continuation of commonly-owned, U.S. patent applicaton Ser. No. 07/684,668, filed on Apr. 12, 1991 by Yin, Chen and Bair, now U.S. Pat. No. 5,278,769.

TECHNICAL FIELD OF THE INVENTION

The present invention relates to the automatic generation of simulation models, particularly for digital logic circuits.

BACKGROUND OF THE INVENTION

In the design of modern electronic systems, it is increasingly common for large blocks of circuitry to be incorporated into custom integrated circuits known as ASICs, or Application Specific Integrated Circuits. These circuits are typically designed with the assistance of computer-aided engineering (CAE) tools. The actual process of design is such that the designer will use a graphics-based workstation to "draw" schematics of a circuit on the workstation's display screen. This is accomplished by positioning and interconnecting a number of pre-defined circuit elements. Such circuit elements are represented on the display screen by schematic symbols, but also have further, lower level circuit representations associated with them. For example, a logic AND gate may be represented on the designer's display screen as a three terminal device having two inputs and one output. At a lower level, however, there is a representation of that AND gate in the form of a transistor circuit comprising transistors, resistors, etc. It is in this form, that the circuit will actually exist on an integrated circuit when it is completed.

In order for a designer to be certain that his circuit will perform correctly when it is transformed into an ASIC, it is essential that accurate circuit simulation capability be available during the design process. Such simulations must take into account circuit delays, timing dependencies, loading characteristics, and layout induced effects such as parasitic capacitances, etc. These simulations are usually provided in the form of logic and timing models, which allow the designer to closely approximate the performance of his circuit when it is subjected to the stimuli that he specifies. The more accurate the simulation models, the higher the designer's confidence level that the circuit will perform as planned.

A number of tools exist which facilitate the task of ASIC design. Among these are a number of different types of simulators. Each type of simulator operates on a circuit description at a different level of abstraction.

The lowest level simulator is a circuit simulator. One such simulator is SPICE, available under a number of trade names from a number of different vendors. SPICE is a "standard" simulator, which has grown into a de-facto industry standard over a number of years. All SPICE simulators model circuits and their interconnections in the same way, and as such produce very similar results. One commercially available SPICE simulator is HSPICE, produced by Meta-Software Incorporated.

Circuit simulators, such as SPICE and its many variants, model a circuit in very great detail. All circuit elements are modeled in an analog fashion, and transistor models are very complete, taking into account many of the actual physical characteristics of the device. Voltages and currents are modeled as continuously variable entities, rather than the simple one-zero modeling of digital simulators. As a result, circuit-level model results are extremely accurate and highly representative of the performance of actual circuits. Very accurate information about propagation delays and effects of loading, parasitic capacitances, etc., may be derived from circuit-level simulators. Unfortunately, the extreme level of detail used in circuit-level simulation requires a very large number of calculations and restricts their practical use to smaller circuits, or where extremely detailed and accurate information is required.

Switch-level simulators attempt to provide fairly detailed and accurate simulations of digital circuits by modeling all of the transistors in a circuit as switches which may be either closed or open. While this type of model does not deal well with the effects of transistor parameters, for many types of digital logic it provides a reasonably accurate approximation with significantly fewer calculations required than for circuit-level simulators. As a result, fairly detailed and accurate simulation results may be obtained in far less time than is required for circuit level simulation. One commercially available switch-level simulator is TIMEMILL, produced by EPIC Design Technology, Incorporated.

Gate-level simulators are one level of abstraction further away from the circuit than switch-level simulators. Such simulators model a circuit as a group of interconnected logic gates. The logical functions are simple enough to perform, but propagation delays and timing relationships are handled in the form of lumped parameters. Some such simulators will attempt to account for the approximate effects of loading by applying simple equations for propagation delay where the delay is a function of the number of connections. Further, parameters may be passed back from detailed simulations whereby the effects of parasitic capacitances may be approximated, again in the form of a lumped parameter. Gate-level simulators run extremely fast compared to either circuit-level or switch-level simulators, due to the smaller number of calculations required. Provided that the lumped parameters are calculated properly, gate level simulators can provide very reasonable approximations of actual circuit performance. LSI Logic and Mentor Graphics are both commercial sources of gate-level simulators.

One other tool which is commonly made available by vendors of CAE stations and software is timing verification. Timing verification is performed by software which analyzes the timing relationships between logic state changes within a circuit and determines if certain timing criteria such as minimum set-up and hold times have been violated. Timing verifiers do not attempt to model the circuit as it would operate, but rather attempt to analyze the circuit's behavior in the form of relative delays, and cause and effect relationships within a circuit.

Because of the size and complexity of circuits which are commonly put into ASICs, it is essential to the designer that circuit simulations run fast. For this reason, logic simulation of ASICs by the designer is performed almost exclusively through the use of gate-level simulators. In order for gate-level simulation to provide reasonably accurate approximations of actual circuit performance, a fairly extensive process of analysis, simulation and model preparation is required of the tool vendor.

The process of generating logic and timing models for a new circuit element, e.g., gate, flip-flop, adder, etc., is typically a lengthy, labor-intensive process whereby schematics are drawn at both the logic-level and circuit-level. A circuit-level model is generated from the circuit-level (transistor circuit) schematic by means readily available in the present art, usually automatically. The logic circuit and transistor circuits are then analyzed to determine what stimuli should be applied to the circuit level model to arrive at simulation results which will give best indication of the delay characteristics of the circuit. The circuit is laid out and an analysis is performed to determine the effect of adjacent wire runs, etc., on the overall performance of the circuit. The circuit-level simulation is run under several different simulated conditions of power supply voltage and temperature to determine worst and best case delay characteristics, rise and fall times, etc.

The simulation results are examined to determine from the difference in time between critical stimuli and output transitions what values of propagation delay, etc., should be used for the purpose of logic modeling. The logic diagram is annotated with these values in the form of attributes which can be read and acted upon by a logic simulator. Layout induced effects are taken into account, the delay values are altered accordingly, and the logic model is complete.

Timing verification models are usually generated manually based upon data derived from the simulation run and also on knowledge of circuit function and topology. Some logic simulators, such as MDE from LSI Logic Incorporated, combine the functions of logic simulation and timing verification into a multi-mode modeler.

Once a model has been generated, it is common practice to compare the results of circuit-level, switch-level, and gate-level simulations to verify that the results track one another closely. This process is known as model verification. If the models do not track closely enough, the user of a logic simulator will not get accurate representations of the performance of his design, reducing overall confidence that the circuit will perform correctly when it is incorporated into an ASIC.

In the present art, all of the aforementioned simulation, analysis, and parameter extraction operations are performed manually by human operators. Very often, many different people perform different steps in the process, due to the many sets of skills required. Because of the labor-intensive nature of logic/timing model generation and because of the rapid rate of change in the field of digital electronics, it becomes extremely desirable to have a method of automating the process so that accurate logic and timing models may be generated quickly enough to keep up with the needs of the design community, without requiring large, dedicated, highly-trained staffs.

DISCLOSURE OF THE INVENTION

It is therefore an object of the present invention to provide a means for automatic generation of logic models by using the schematic data base of an arbitrarily chosen schematic capture system.

It is a further object of the present invention to provide means for providing an arbitrarily chosen circuit-level (or transistor-level) simulator with appropriate input stimuli to establish timing-related parameters by automated examination and analysis of circuit topology and function.

It is a further object of the present invention to provide means for automatic extraction of timing-related parameters from said circuit-level simulation results.

It is a further object of the present invention to incorporate those automatically extracted timing-related parameters into logic and timing models by automatic means.

It is a further object of the present invention to provide a means of automatic verification of the functional and timing accuracy of the generated models.

According to the invention, there is a pre-existing integrated circuit design environment including a schematic capture station, a logic simulator, timing verifier, and circuit simulator. The hardware of such design environments generally minimally comprises a computer, keyboard, graphic display means (such as a color graphic CRT display system), and graphic input means (such as a mouse or a digitizing tablet). Generally the hardware would be based upon a commercially available computer workstation, such as those provided by Sun Microsystems or by Apollo Computer Incorporated, and the software of the design environment would be provided as an integrated set of tools by one manufacturer, such as the design environments provided by LSI Logic Incorporated or Mentor Graphics Incorporated. There also exists a logic schematic prepared on the schematic capture station for which an accurate logic simulation is desired, and from which a net-list has been prepared. A net-list is a file comprising descriptions of the logic primitives (e.g., AND/OR gates, etc.) used in the logic schematic and the interconnections therebetween. This is generally accomplished automatically by the schematic capture system upon completion of the logic schematic, although some systems may require an additional step of logic compilation, whereby the user invokes a program to perform the process of conversion of the graphical schematic data to a net-list. In any case, the capability of net-list generation is widely known and implemented in all present schematic design environments.

At the top level, according to the invention, there is a control program which runs all of the other programs in the appropriate sequence, directing to those programs the requisite files and data structures. This top-level program operates according to the process flow in the following description.

In the present invention, a series of programs are run which invoke, operate on the data from, and integrate the capabilities of a number of existing design tools (simulators, data analysis, etc.). These programs operate on the logic schematic data base prepared by the user, prepare input files for the existing tools, invoke the existing tools, analyze the output files thereof, and ultimately combine the outputs of the existing tools into useful logic models. The end result is the appearance to the user of an automatic process of logic model generation. This process of input file preparation and output file analysis would ordinarily be performed by human operators, often by many different people due to the different skill levels required at each step.

After the net-list has been prepared, one program of the current invention analyzes the logic schematic, via the net list, for all of the possible paths from primary inputs to outputs, ultimately producing a list of input-to-output paths where a change of state an the input will effect a change of state at the output, and the input patterns under which those state changes will be effected. Such patterns and dependencies will include a prerequisite sequence of events in the case of sequential circuits, whereas combinational circuits will require only a static description of the states of the other inputs. This analysis is performed by a graphic-walking algorithm, which is a form of reachability analysis; a technique which is well known in the present art. This program's output is designed so that the format of the output data will be in the form of a stimulus file for the circuit-level simulator of the design environment. Since the choice of design environment is entirely arbitrary, and hence the choice of circuit simulator is entirely arbitrary, the exact format of the output will vary from implementation to implementation. Similarly, the input (net-list) format will be dependent upon the specific design environment chosen. As such, the process of net-list interpretation into an internal representation of circuit connectivity will vary from implementation to implementation. In any case, however, the internal process of reachability analysis remains unchanged.

In order to simplify the process of input-to-output path determination, delay paths for sequential logic elements, e.g., latches and flip-flops, are pre-defined according to the known characteristics of circuits with their topology. This greatly reduces the amount of computer analysis required for delay path identification.

Also after the net-list of the logic schematic (or logic-level schematic) has been prepared, a transistor-level schematic (or circuit-level schematic) is prepared corresponding to the logic-level schematic. This schematic represents the same circuit, but at a level where all circuit blocks in the logic circuit are represented by their actual transistor circuits. This transistor-level schematic is prepared using the existing tools on the integrated circuit design station. Depending upon the exact integrated circuit technology in use, the exact form of this circuit representation of the logic schematic may vary widely. For example, there are very significant differences between the transistor-level circuits of the same logic circuit in NMOS and CMOS technologies. Differences also exist in the transistor-level circuits and implementations of the same logic circuit even when similar CMOS technologies are implemented by different manufacturers.

In general, the transistor-level schematic diagram is generated either automatically or semi-automatically by the software of the integrated circuit design workstation. In some cases, where highly optimized, highly customized circuits are being designed, the transistor-level circuit will be generated manually or modified from automatically generated transistor-level schematics by an operator or operators with special knowledge of the characteristics of the integrated circuit manufacturer's particular process in use. Similarly, the layout process (process of arranging the transistors and passive components for placement on an integrated circuit) may be either automatic, semi-automatic, or manual, for similar reasons.

After layout, an automated process of analysis is performed, whereby the layout of the circuit is analyzed for parasitic capacitances between adjacent signal runs, etc., and a list of layout-related circuit parameters is generated. This set of layout-related circuit parameters is then used to modify the transistor-level schematic so that circuit equivalences of the parasitic effects are incorporated into the circuit simulation. This process is accomplished automatically in many manufacturers' modern integrated circuit design software, and is well known in the present art.

In a manner similar to that used for the logic-level schematic, a net-list is generated for the circuit-level schematic. This net-list is translated into a circuit-description format usable by the circuit-level simulator. Circuit-descriptions are separately generated for each primitive (e.g., NAND, NOR, D-FLOP, etc.) in the circuit. Automatic means for this translation are provided as part of most modern integrated circuit design environments. The translation process is a relatively straight-forward formatting process and is well known in the present art. One suitable such simulator is HSPICE, produced by Meta Software Incorporated, typical of SPICE simulators widely used in the present art. The simulator operates on the transistor-level circuit description according to the input stimulus data previously prepared from the reachability analysis of the logic-level circuit and produces outputs representing the transistor-level circuit's response to that input stimulus. The simulator's output is examined at critical transition points and delay and timing parameters are extracted.

Next, a set of simultaneous equations representing the multiple contributors to delay for each path are generated and solved according to an existing mathematical technique known in the art as the "SIMPLEX" method, whereby optimal values are determined. For the purposes of this analysis, "optimal" means minimum error magnitude in the delay value associated with each primitive.

The process of running the simulator and extracting delay parameters is performed automatically in LSI Logic Inc.'s integrated circuit design environment by a program called "CHARMS", which runs the HSPICE program, providing it with the necessary input files, and analyzes the outputs for input-to-output delay and timing parameters.

The delay values generated in the "SIMPLEX" analysis process are applied directly to a timing model, the input and output dependencies for which were already determined as a part of the reachability analysis. The timing model generation process is simply a format translation problem, and will vary from implementation to implementation, depending upon the particular timing verifier's model format.

The final step of model generation is generation of the completed logic model. Functional models of combinational logic circuits are already generated automatically by present integrated circuit design environments. The model generator of the present invention uses this same process, but applies the delay information derived from the circuit-level simulations and "SIMPLEX" analysis to the primitives so that very accurate logic models are created.

In order to verify the timing accuracy of the model, a verification step is performed whereby the input stimuli used for the circuit-level simulation are converted to a format usable by the logic-level simulator and are applied to the newly created logic model. The resultant outputs from the logic-level simulator are compared with the outputs from the circuit-level simulator, and if the output transitions from the two simulations do not deviate by more than some predetermined amount, then the logic model is said to be accurate and is ready for use. In the rare case of significant deviation, manual alteration of the logic and timing models will be required.

The amount of deviation which will be permitted (error tolerance) between simulations is determined on an implementation by implementation basis, based upon the known overall accuracy of the simulators and their methods of calculation. Another criterion in the selection of the error tolerance is the level of accuracy in logic simulations required by the system, technology, or user.

One final model verification step is performed, whereby the results of the different simulation runs are compared for functional accuracy. This is significantly different from the timing verification step, where the output of the circuit level simulator and the logic-level simulator are compared for timing compatibility. The functional verification step ensures that the model behaves in the same way at all levels: logic-level, switch-level, and circuit-level.

Other objects, features and advantages of the present invention will become evident in light of the following description thereof.

DETAILED DESCRIPTION OF THE INVENTION

For the purpose of detailed description of the invention, it will be assumed that LSI Logic's integrated circuit design environment is the basis upon which automatic model generation is built. This environment includes a computer, graphic display screen, graphical input device, keyboard, schematic capture software, net-list generation software, logic simulation software, logic-level to transistor-level translation software, circuit simulation software, net-list to circuit-level simulation input conversion software, "CHARMS" software for running the circuit simulator and analyzing the results for pin-to-pin delay characteristics, as well as all software of the present invention.

Figure 1:
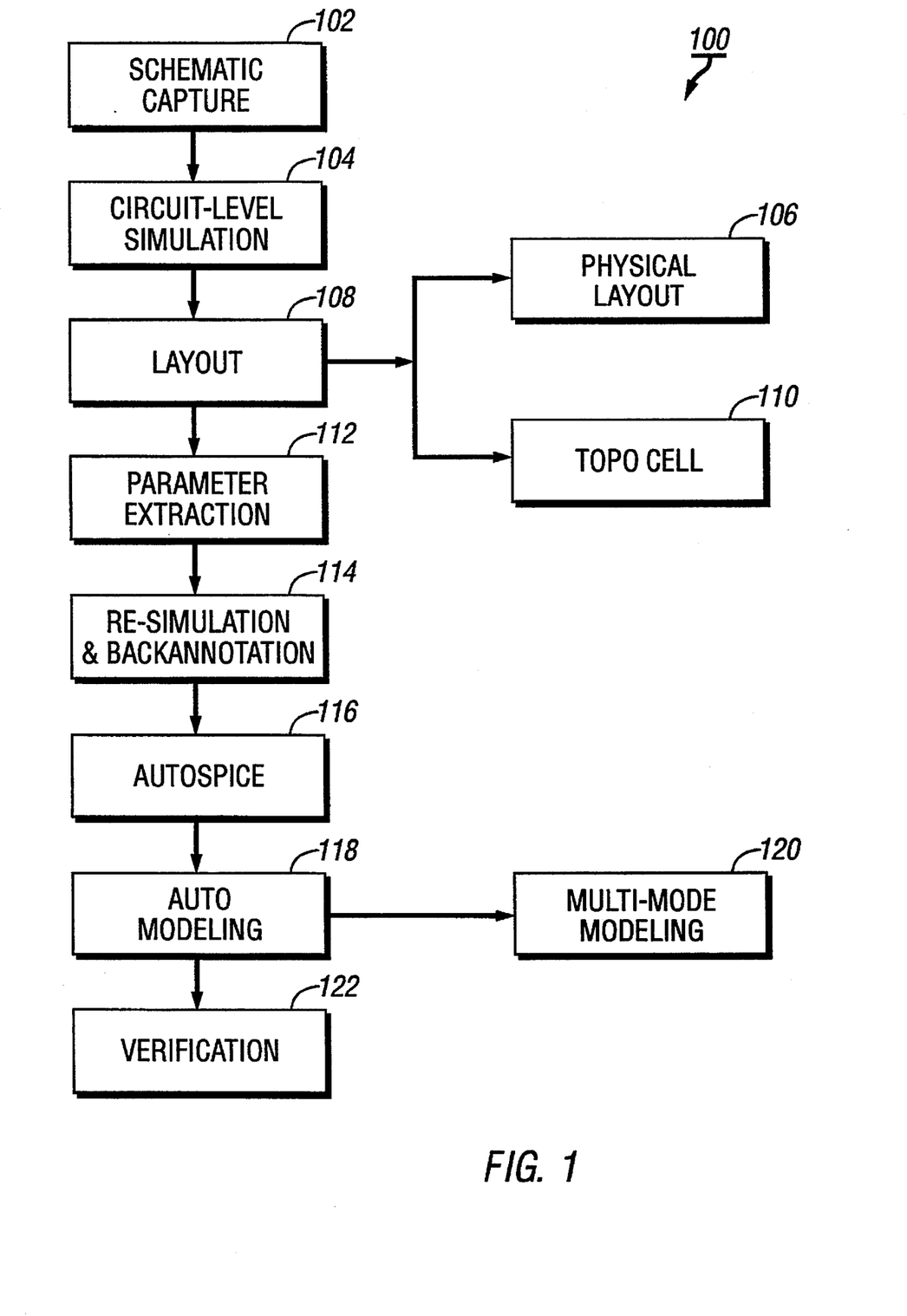
FIG. 1 is a process flow diagram showing the steps involved in the logic model generation process of the present invention

FIG. 1 shows a process flow diagram 100 detailing the steps from the beginning to the end of the model generation process. Box 102 with respect to FIG. 1 represents the schematic capture process whereby the user enters his logic diagram into the integrated circuit design environment using the schematic capture software. Box 104 with respect to FIG. 1 represents a circuit-level simulation process performed on a transistor-level representation of the user's schematic generated by the software of the integrated circuit design environment for the purpose of functional verification.

Box 108 with respect to FIG. 1 represents a physical layout process whereby the transistor-level circuit entered by the user is arranged for placement onto an integrated circuit in the form of a physical layout 106. A standard cell 110, which is a standardized library representation of the physical layout 106 may also be generated at this time.

Box 112 with respect to FIG. 1 represents a parameter extraction process whereby the layout is analyzed for its effect on the circuit and whereby the transistor-level schematic is modified to account for the effects of the layout.

Box 114 with respect to FIG. 1 represents re-simulation of the circuit to ensure proper function after compensation for layout effects.

Box 116 with respect to FIG. 1 represents a process in the LSI Logic Corp. integrated circuit design environment known as "AutoSpice" (or "CHARMS") whereby a SPICE-type simulator is invoked with a transistor-level circuit description derived from the transistor-level schematic, run according to input-stimuli generated by the software of the present invention, and the results of which simulation are analyzed and delay parameters are extracted.

Box 118 with respect to FIG. 1 represents the automatic model generating software of the present invention whereby the delay data produced in 116 are combined with other logic simulation data to create accurate logic and timing models of the user's circuit.

Box 120 with respect to FIG. 1 represents further model generation for a multi-mode simulator available in the LSI Logic Corp. integrated circuit design environment known as the "MDE" simulator. This simulator performs both logic simulation and timing verification. The creation of a model for this program is simply a matter of re-formatting separate timing and logic simulation models into a form acceptable to the multi-mode simulator.

Box 122 with respect to FIG. 1 represents the model verification process of the present invention whereby the newly created logic/timing model is run on a logic simulator and the results are compared to results obtained in circuit-level and/or switch-level simulation. If the simulations correspond accurately to one another and do not deviate by more than some pre-determined tolerable amount, the logic and timing models are said to be correct and complete.

Figure 2:
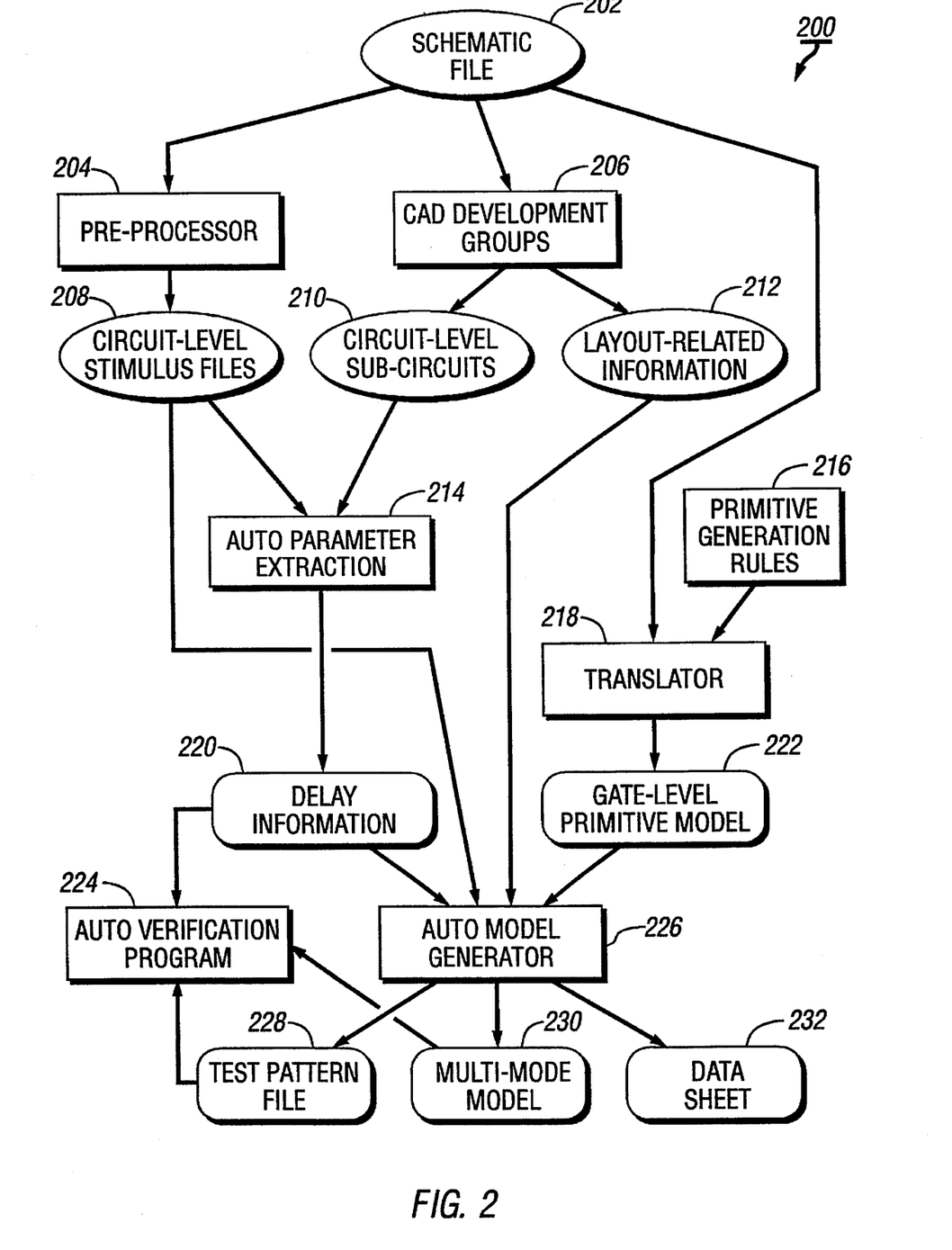
FIG. 2 is a diagram showing the data flow the logic model creation process of the present invention

The data-flow diagram 200, with respect to FIG. 2, shows the data flow through the system in the process of automatic model creation. A schematic file 202, is generated by a user. This schematic file is operated upon in three different ways:

First, one of the software components of the present invention, a translator 218 in the integrated circuit design environment software operates according to primitive generation rules 216 on the data of schematic file 202 to produce a gate-level (logic-level) model of the user's logic circuit. Depending upon the specific logic simulator which will be used in the target environment, the rules may be changed to create raw logic models for any logic simulator.

Second, operations performed by CAD development groups 206, either automatically in software or manually, result in sub-circuit descriptions 210 (transistor-level schematic) of the schematic file 202 and information 212 related to the effects of layout on circuit performance.

Third, a pre-processor 204, one of the software components of the present invention, is run. This pre-processor performs a reachability analysis from the inputs to the outputs of the schematic file 202 and determines its input-to-output (or pin-to-pin) delay paths an the input stimulus patterns required to effect transitions along those input-to-output delay paths, producing circuit-level stimulus files 206.

A process 214, automatic parameter extraction (performed by the "CHARMS" software in the LSI Logic Corp. integrated circuit design environment) operates on the circuit level stimulus 208 and the circuit-level description 210, causing circuit-level simulations to be run. The results of those simulations are analyzed producing delay information 220.

When delay information 220, layout related information 212, and raw logic-model 222 are all available an auto-model generator 226, another software component of the present invention, combines and re-formats the data and model information of 220, 212, and 222 into a multi-mode model 230. In the case of the LSI Logic Corp. system, the model is prepared for the "MDE" simulator. In the case of other systems, other simulator model format(s) would be used. If multi-mode modeling is not available on the target system, the output of auto-model generator 226 would be broken into two discrete parts: a timing model and a logic model. In such a case, multi-mode model 230 may be considered as comprising the two component models (timing model and logic model).

Other outputs of the auto-model generator software are a test pattern file 228 and a data sheet 232. The process of generating test pattern file 228 is simply a re-formatting process whereby the circuit level stimulus files 208 are re-generated for the target logic or multi-mode simulator. Generation of data sheet 232 is also a formatting process whereby the newly established timing parameters for the logic model and the graphic representation thereof are combined into a human readable form.

An auto-verification program 224, the final software component of the present invention, operates on the delay information 220 resulting from circuit level simulation, newly created model 230, and translated test-pattern file 228 to run a comparison simulation using the new model. The results of this simulation are compared to the results of the circuit level simulation 220. If the results do not deviate by more than some pre-specified error tolerance, then the model is complete.

Figure 3:
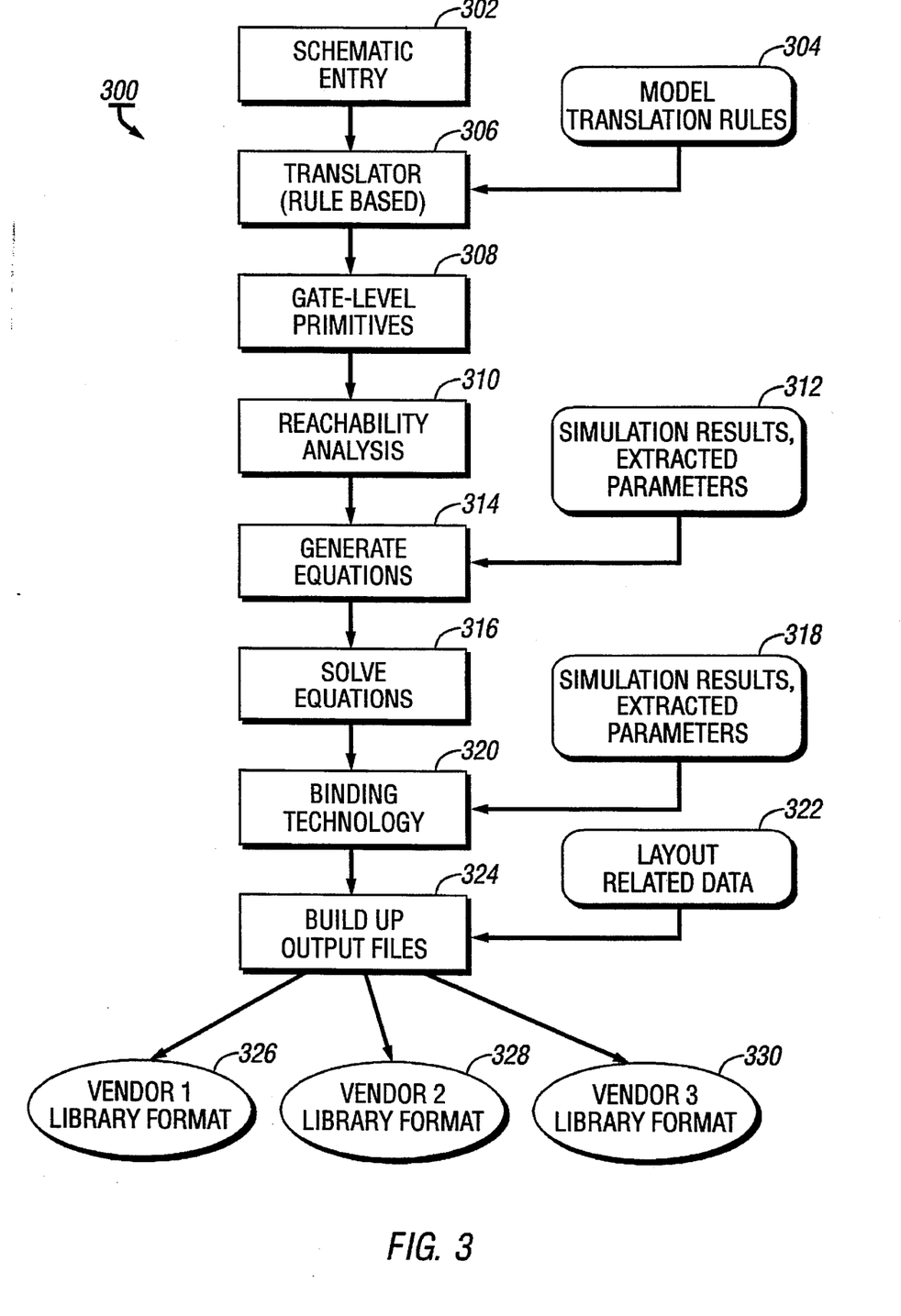
FIG. 3 is a flow diagram showing the major steps involved in the model-generation program of the present invention.

Flowchart 300 with respect to FIG. 3 represents the control flow which is implemented in the top-level program of the present invention. After schematic capture and net-list conversion 302 is complete, the rule-based translator 306 (corresponding to 218 with respect to FIG. 2) is run producing gate level primitives 308 (corresponding to 222 with respect to FIG. 2). Next, reachability analysis 310 is performed (corresponding to pre-processor 204 with respect to FIG. 2), from which the output is used to generate a set of simultaneous equations by process 314. Next, process 316 solves the simultaneous equations to produce delay data (corresponding to 220 with respect to FIG. 2). Process 312 corresponds to the combination of 214 and 220 with respect to FIG. 2. Processes 314 and 316 correspond to parts of 226 with respect to FIG. 2.

Again with respect to FIG. 3, process 320 combines all of the generated model and delay information into a useful internal representation and process 322 (corresponding to 212 with respect to FIG. 2) formats these into the appropriate output files. Processes 314, 316, 320, 322 and 324 in combination correspond to auto-model generation 226 with respect to FIG. 2. By using different sets of formatting criteria, models may be generated for different manufacturer's logic model libraries, represented by 326, 328, and 330, with respect to FIG. 3. By creating a number of different models at different levels (e.g., circuit-level, switch-level, and logic-level) more opportunities are created for model verification. The greater the number of comparisons performed by the auto-verification process, and the greater the agreement between the corresponding simulations, the greater is the confidence level that the models will perform accurately and repeatably.

Figure 4:
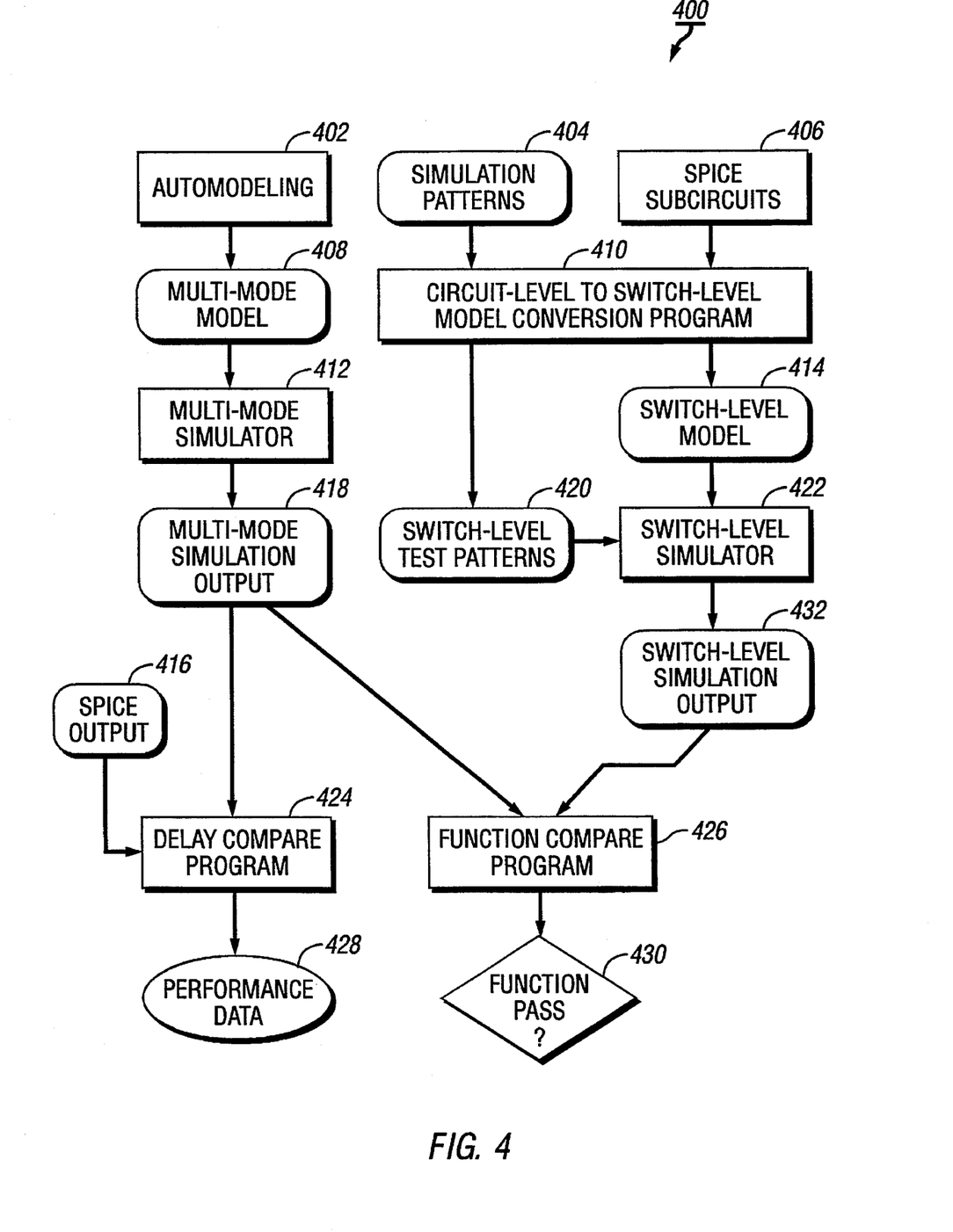
FIG. 4 is a diagram showing the data flow in the model verification process of the present invention.

Data flow diagram 400 with respect to FIG. 4 represents the process of auto-verification. Before auto-verification is performed, auto-modeling program 402 will have created a logic or multi-mode model 408, and simulation patterns 404 and SPICE (or other circuit-level model) sub-circuits 406, will have been produced in the process of auto-model generation.

A model translation process 410 incorporated into the model verification process 400 translates the circuit-level model 406 (typically a SPICE model) and circuit simulation patterns 404 into a switch-level model 414 and switch-level simulation patterns 420 which will be run on a switch-level simulator 422. A switch-level model performs functions similar to those of a circuit-level model, but the detailed, discrete transistor models are replaced with switches which can assume either an open (disconnected, or OFF) state or a closed (shorted, connected or ON) state. This type of simulator operates much faster than a circuit-level simulator, because of the significantly reduced number of calculations required due to the simplified model. This makes the switch-level simulator ideal for real-time model verification, and good for functional verification. Both the logic (or multi-mode) model 408 and the switch-level model 414 are run on the logic (or multi-mode) simulator 412 and the switch-level simulator 422, respectively, producing logic (or multi-mode) simulation output 418 and switch-level simulation output 432. The functional responses of the logic simulation 418 and the switch-level simulation output 432 are compared. If there is functional agreement (both output do the same things in response to the same stimuli) then the function pass criteria 430 are satisfied. The SPICE output 416 (circuit-level simulator) and logic (or multi-mode) simulator output 418 are compared via a delay compare program 424. Provided that delay results are adequately close, as specified by a pre-determined error tolerance, performance data 428 is generated for examination by the user.

Figure 5:
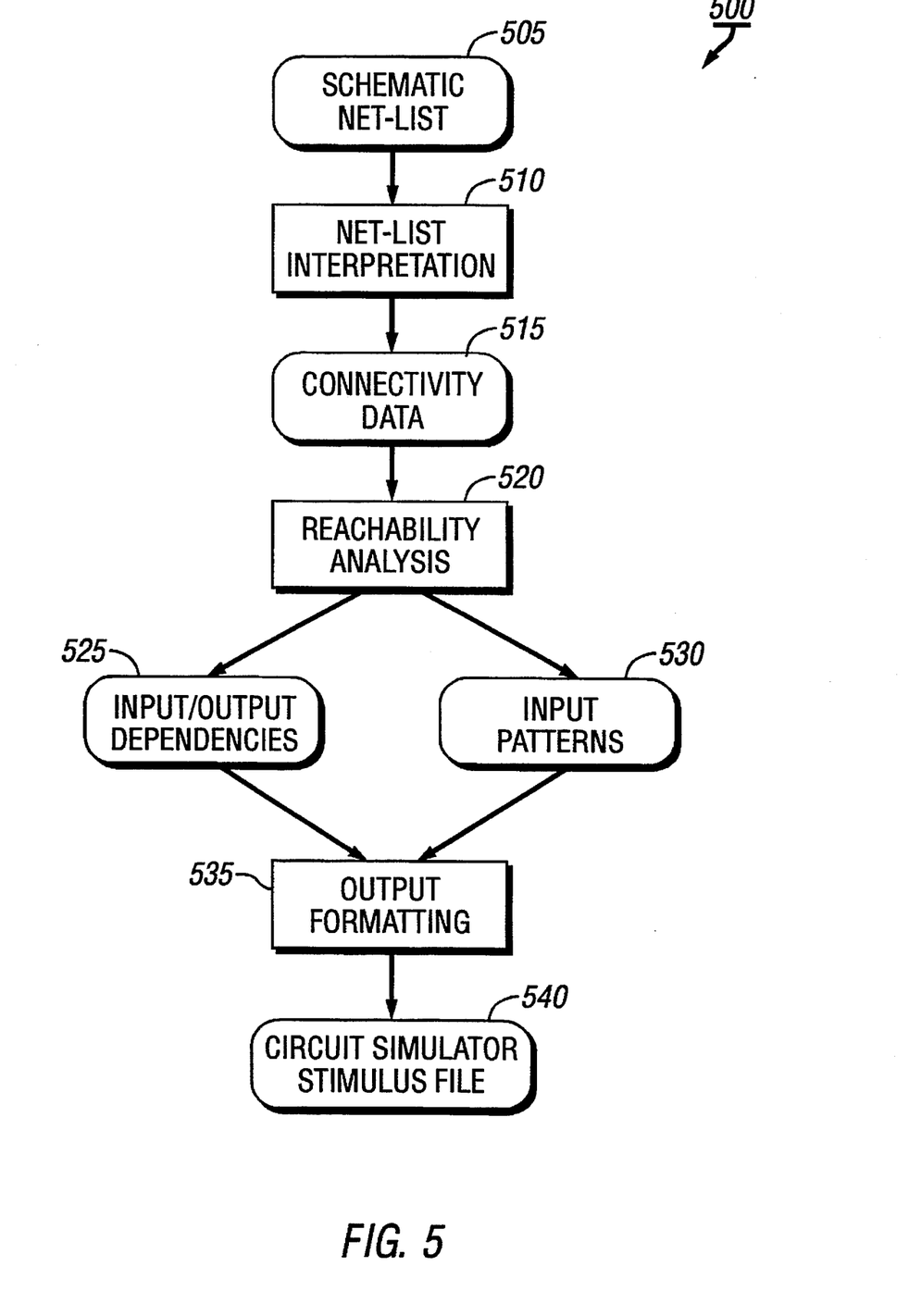
FIG. 5 is a diagram showing the data flow in the net-list analysis and stimulus file generation of the present invention.

The data-flow diagram 500 of FIG. 5 shows the operation of the pre-processor program (204 with respect to FIG. 2). A schematic net-list 505 is read and interpreted by a net-list interpretation process 510. This process produces connectivity data 515. Reachability analysis 520 is then performed on the connectivity and primitive data of 515 to determine what combinations and sequences of input patterns will cause transitions of the circuit outputs. The result of reachability analysis is a list of input-output dependencies 525 (or delay paths) and the input sequences and patterns 530 required to produce transitions according to those dependencies. An output formatting process 535 operates on the dependencies 525 and patterns 530 according to the input requirements of the circuit-level simulator in the integrated circuit design environment and produces a circuit simulator stimulus file 540.

Figure 6:
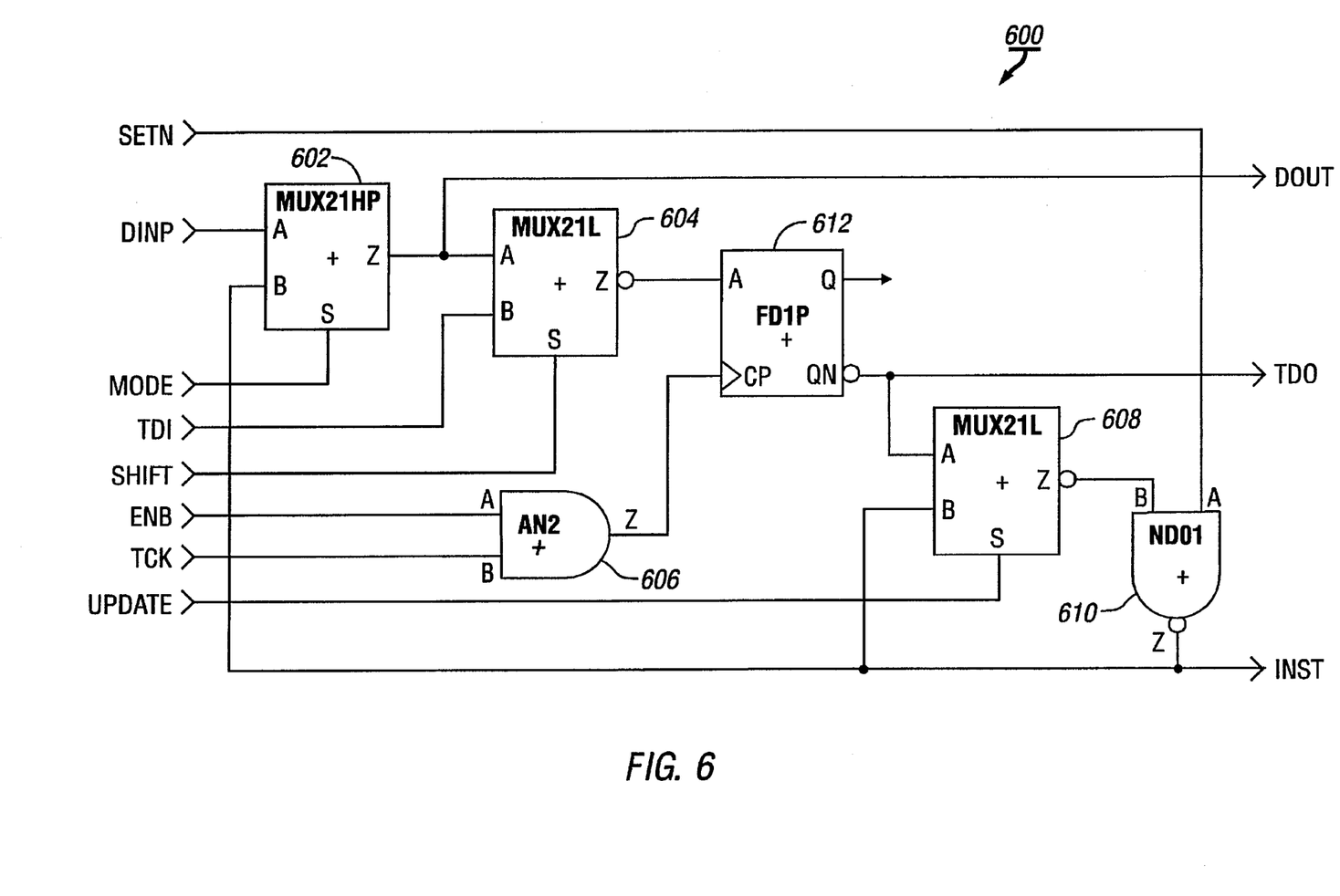
FIG. 6 is a logic-level schematic diagram of a circuit used for sample analysis in the description of the present invention.

FIG. 6 is a schematic diagram of a logic circuit 600 to be operated on by the model generation system of the present invention. The circuit comprises combinational logic elements 602, 604, 606, 608 and 610, and sequential logic element 612 and interconnections therebetween.

Figure 7:
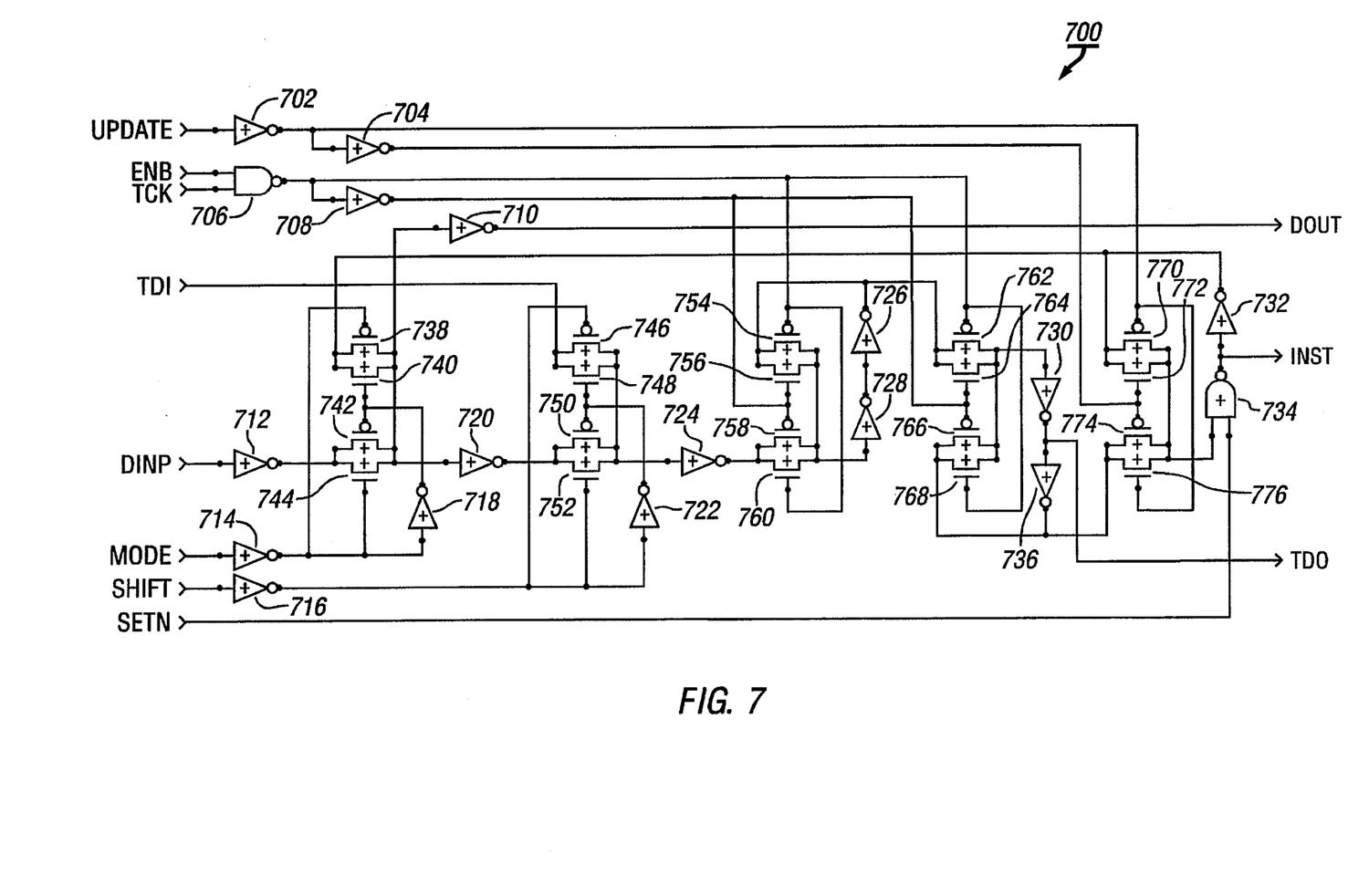
FIG. 7 is a partial transistor-level representation of the logic-level schematic of FIG. 6 where the sequential element has been replaced with its transistor and primitive components.

FIG. 7 is a schematic diagram 700 of the result of reducing the logic circuit 600 with respect to FIG. 6, into its logic primitive and transistor subcomponents. The circuit 700 includes logic primitives 702, 704, 706, 708, 710, 712, 714, 716, 718, 720, 722, 724, 726, 728, 730, 732, 734, and 736, and transistors 738, 740, 742, 744, 746, 748, 750, 752, 754, 756, 758, 760, 762, 764, 766, 768, 770, 772, 774, and 776.

Figure 8:
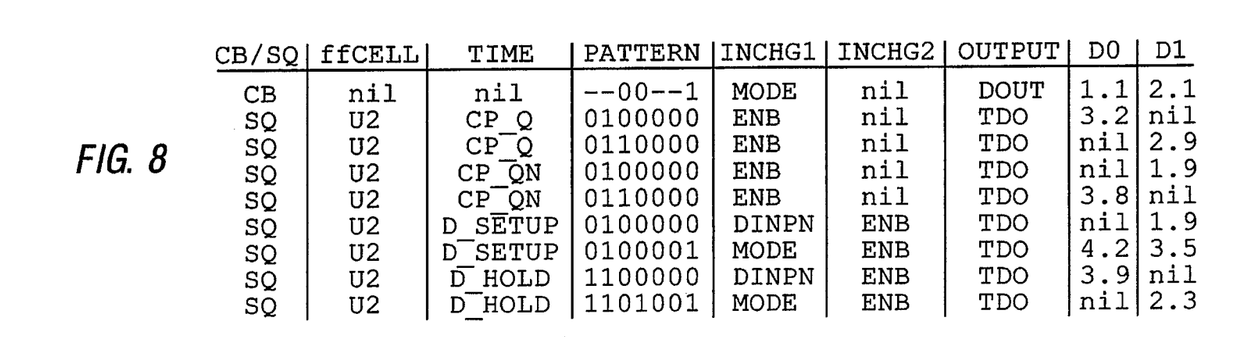
FIG. 8 is a listing of the results of reachability analysis for the circuit of FIG. 6 showing the input-to-output dependencies found, their types, and input patterns.

FIG. 8 is listing of the results of reachability analysis (i.e., circuit simulator stimulus file 540 with respect to FIG. 5) of the schematic of FIG. 7 showing cell type (CB = combinational, SQ = sequential), parameter names, input pattern, and input/output relationships.

Figure 9:
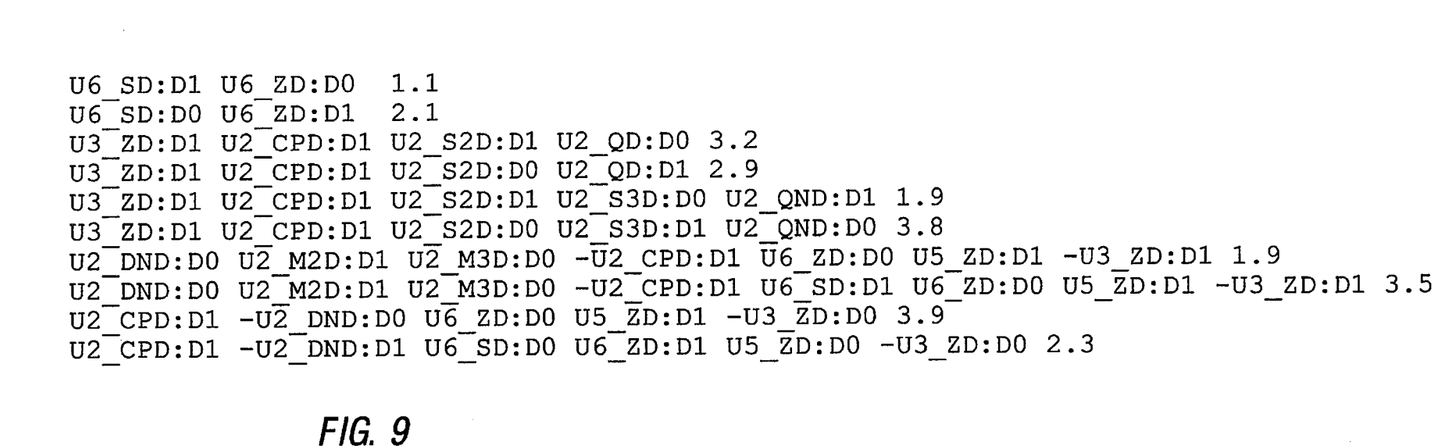
FIG. 9 is a listing of the simulator stimuli derived from the results of reachability analysis for the circuit of FIG. 6.

FIG. 9 is a listing of an equations file, (i.e., 314 with respect to FIG. 3) created by reformatting the results of reachability analysis according to appropriate simulator input requirements, and delay information (i.e., delay information 220 for auto parameter extraction 214 with respect to FIG. 2).

Figure 10:
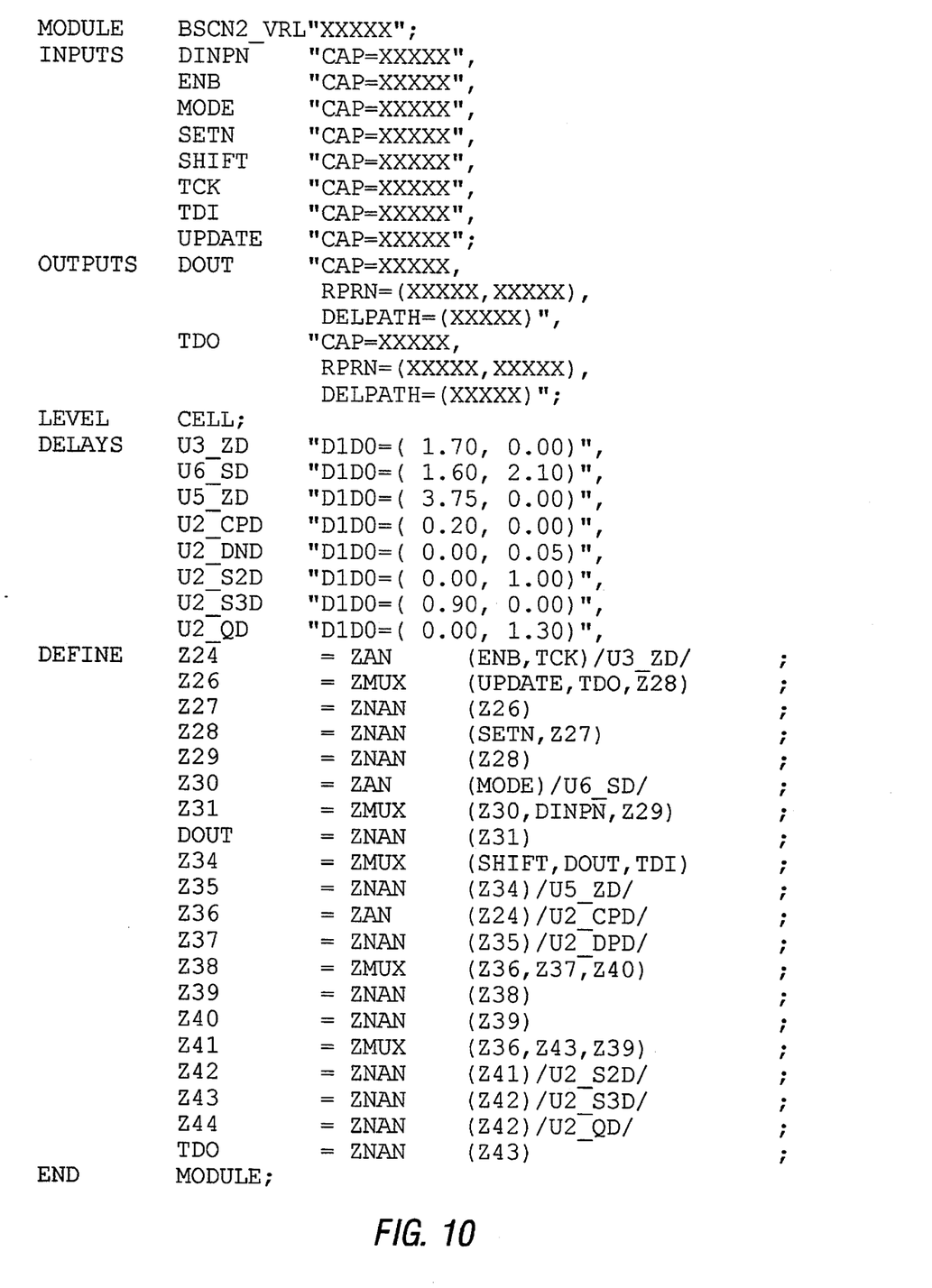
FIG. 10 is a listing of a generated logic model file template for the circuit of FIG. 6, where layout-related parameters (capacitances) have not been supplied.

FIG. 10 is a listing of a logic simulator model source file (i.e., 230 with respect to FIG. 2) listing the appropriate delays, primitives, and timing relationships between pins. These results were derived from the auto-model generator (i.e., 226 with respect to FIG. 2).

Figure 11:
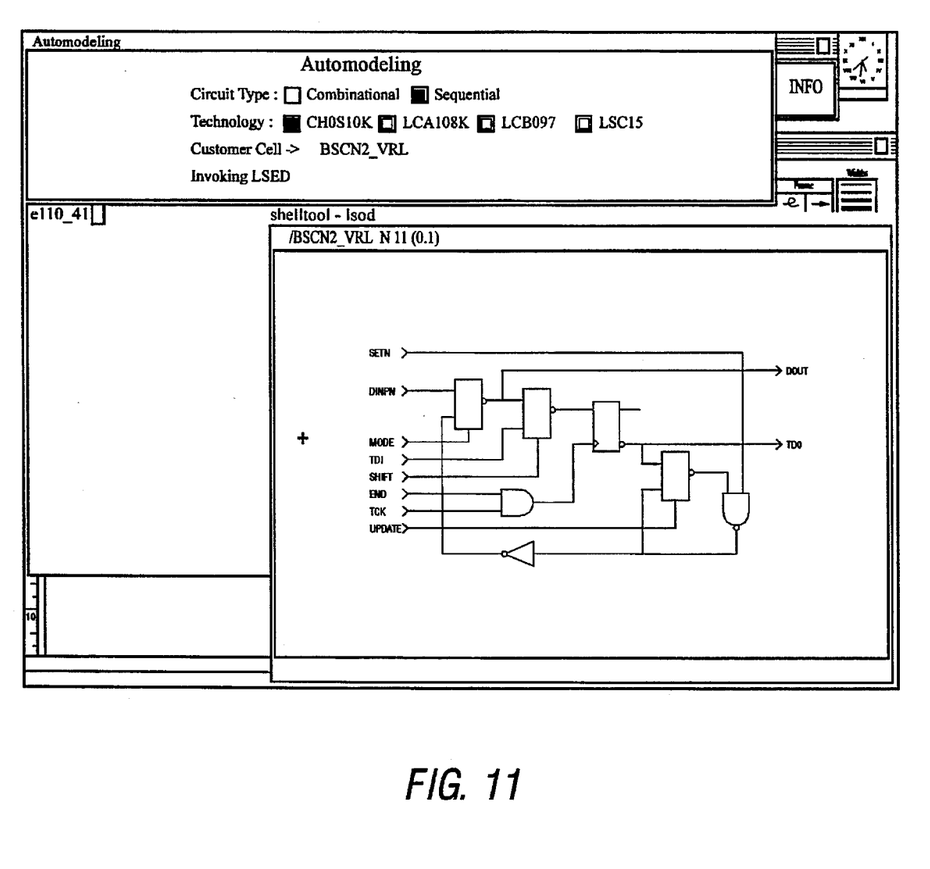
FIG. 11 is a display screen representation of the user's view of the system during model generation for the sequential portions of the circuit.

FIG. 11 is a display screen representation of the user's view of the system during model generation for the sequential portions of the circuit.

Figure 12:
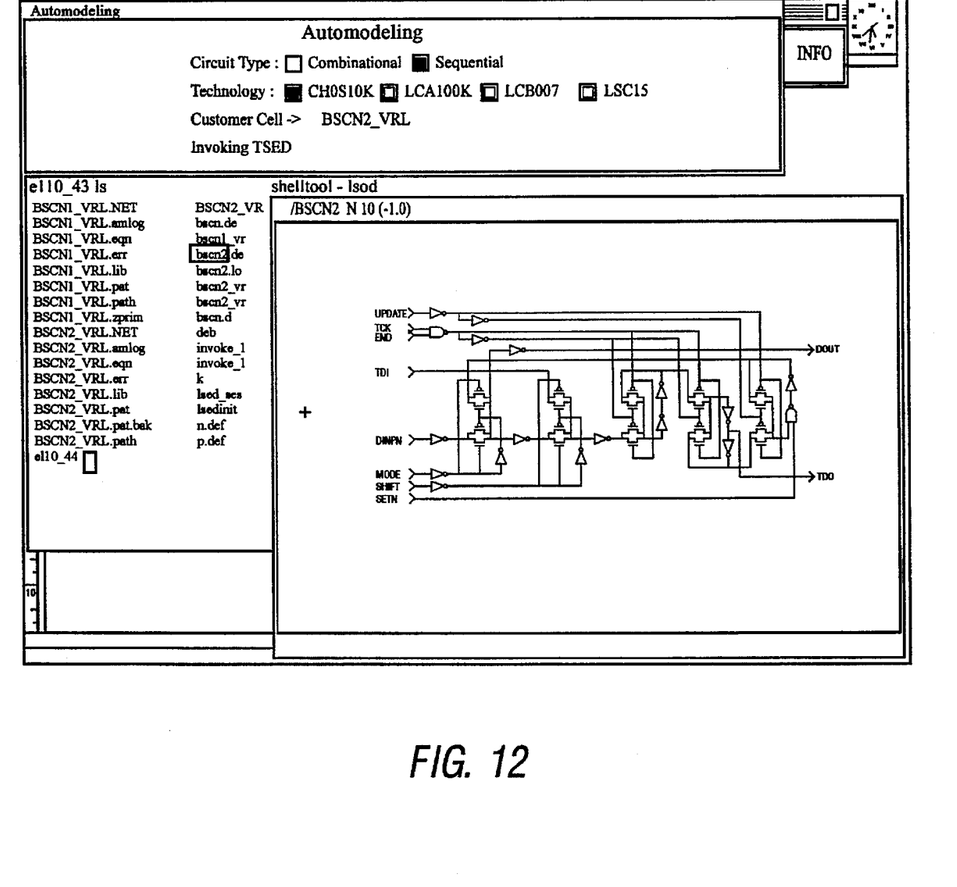
FIG. 12 is a display screen representation of the user's view of the system during model generation for the overall circuit with the sequential portions included.

FIG. 12 is a display screen representation of the user's view of the system during model generation for the overall circuit with the sequential portions included.

Appended to the parent case 07/684,668 are two documents, forming part of the disclosure of the present invention.

"Appendix 1", which can be found in the file of parent case 07/684,668, contains a 'C' language source listing of one embodiment of the top-level process of the present invention which invokes all of the sub-processes and controls the overall flow of automatic model generation.

"Appendix 2", which can be found in the file of parent case 07/684,668, is a description of the user interaction with the auto-model generation system of the present invention in the form of a user's manual.

What is claimed is:

1. Method of generating logic and timing models in an integrated circuit design station having a computer, a graphic display device displaying signals generated by the computer, a graphic input device for making inputs to the computer, comprising performing the following steps in the integrated design station:

operating on the inputs and storing in the computer a net-list interconnection representation of a graphical representation of a circuit;

providing stimulus data corresponding to patterns of input stimuli for the circuit;

simulating performance of a logic-level model of the circuit according to the stimulus data and providing logic simulation results, and representing the logic-level model of the circuit as interconnected logic blocks;

simulating, at the circuit-level, performance of a transistor-level model of the circuit according to the stimulus data and providing simulated performance results;

providing layout information to the transistor-level model of the circuit;

providing timing and delay information obtained from the simulation performance of transistor-level simulation to the logic blocks used in the simulation of the logic-level model;

comparing the logic simulation results with the simulated performance results according to pre-determined criteria for success; and providing an indication of a result of said comparison for automatic verification of the functional and timing accuracy of the generated logic-level model.

2. Method, according to claim 1, further comprising:

simulating performance of a switch-level model of the circuit and providing switch-level simulation results;

comparing the logic simulation results with the switch-level simulation results according to pre-determined criteria for success; and providing an indication of a result of said comparison.

3. Method, according to claim 2, further comprising:

providing timing and delay information obtained for the simulated performance of transistor-level simulation to the switch-level model.

4. Method, according to claim 1, further comprising:

providing said logic model in a human-readable datasheet form.

\* \* \* \* \*